Feb. 4, 1941.  J. E. POWERS  2,230,907
PACKING RETAINER FOR JOURNAL BOXES
Filed April 11, 1940
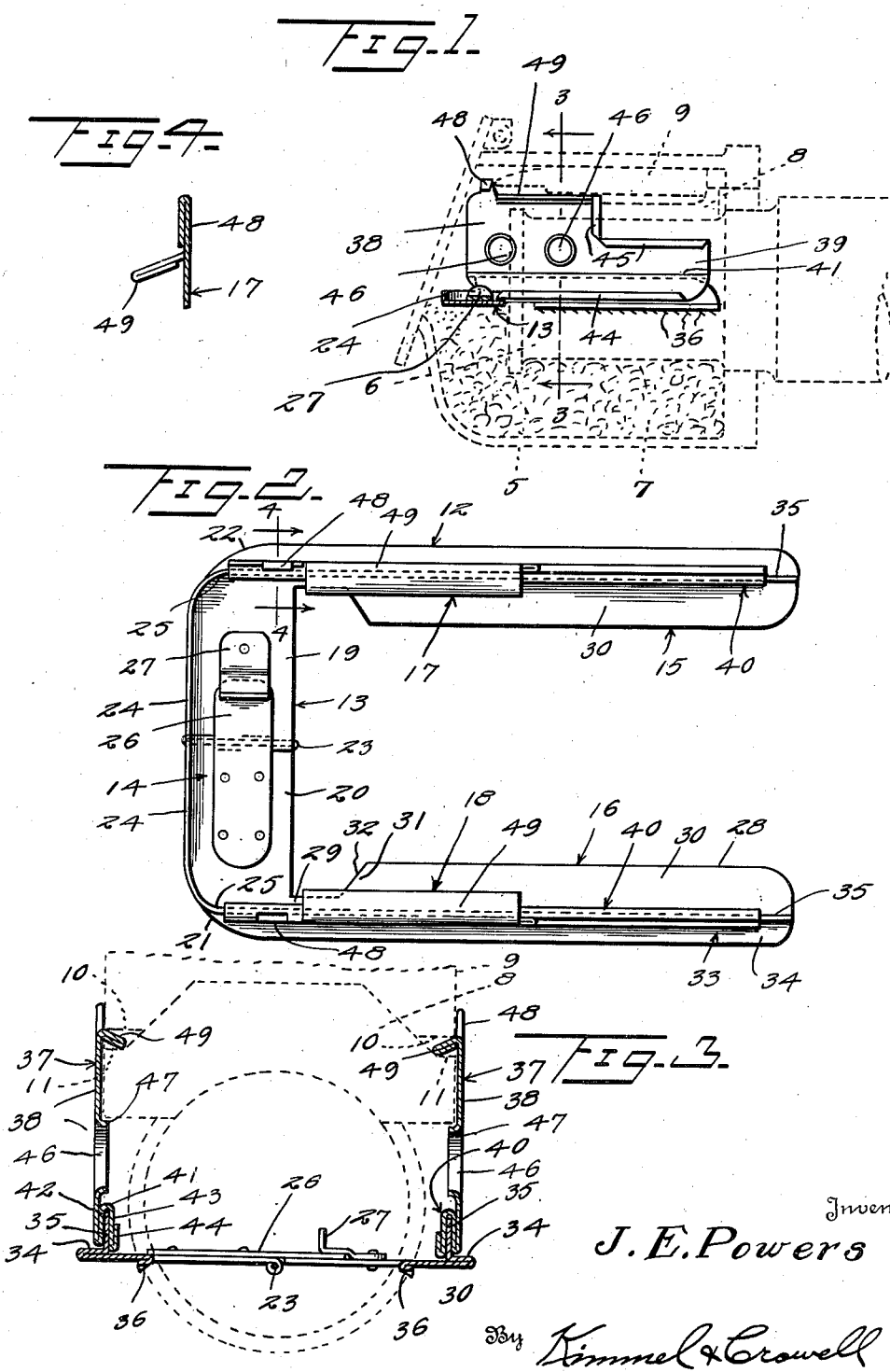
Inventor
J. E. Powers
By Kimmel & Crowell
Attorneys Patented Feb. 4, 1941

2,230,907

UNITED STATES PATENT OFFICE 2,230,907

PACKING RETAINER FOR JOURNAL BOXES

Joe E. Powers, Coffeyville, Kans.

Application April 11, 1940, Serial No. 329,187

11 Claims. (Cl. 308—89)

This invention relates to a packing retainer designed primarily for use in connection with journal boxes employed on the rolling stock of railroads, but it is to be understood that a packing retainer, in accordance with this invention, is for employment in any connection for which it may be found applicable.

The invention aims to provide, in a manner as hereinafter set forth, for retaining the packing for a journal in the well of a journal box and to keep the oil saturated relative to the waste or packing, thereby providing for satisfactorily lubricating the journal and reducing the cost of upkeep.

The invention further aims to provide, in a manner as hereinafter set forth, a retainer of the class referred to for overcoming the objection of the packing rolling up the sides of the journal box to the journal bearing which would cause the journal to catch the packing and take it under the bearing not only creating a hot journal, but also roughening the journal and cutting the bearing to an extent requiring a new bearing to be substituted, and oftentimes a new journal.

The invention further aims to provide, in a manner as hereinafter set forth, a packing retainer for use in connection with journal boxes, which when employed will so hold the packing to prevent the lubricant from draining into a pool and under such conditions the packing will remain saturated with the lubricant resulting in the journal being lubricated at all times.

The invention further aims to provide, in a manner as hereinafter set forth, a packing retainer for overcoming the objections as aforesaid which will eliminate the troubles railroads have to contend with in delays of their trains and cutting or setting out cars between terminals on account of hot boxes.

The invention further aims to provide, in a manner as hereinafter set forth, a packing retainer for use in connection with the journal boxes of railroad rolling stock and providing when used, a material saving in the cost of maintenance relative to said stock.

The invention further aims to provide, in a manner as hereinafter set forth, a packing retainer for journal boxes and which, when employed, will materially increase the life of the waste, a journal and the bearing for the latter.

The invention further aims to provide, in a manner as hereinafter set forth, a packing retainer for journal boxes which so retains the packing relative to a journal and the bearing for the latter to prevent the possibility of hot boxes.

The invention further aims to provide, in a manner as hereinafter set forth, a retainer for the purpose referred to which is simple in its construction, strong, durable, compact, light in weight, expeditiously installed in and removed from a journal box when desired, thoroughly efficient in its use, readily assembled and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a vertical sectional view of the packing retainer, in accordance with this invention installed with respect to a journal box; the latter is shown in dotted lines, as well as a packing, a journal, a bearing for the latter and a wedge arranged within the box, Figure 2 is a top plan view of the retainer, Figure 3 is a section on line 3—3, Figure 1, and Figure 4 is a section on line 4—4, Figure 2.

With reference to the drawing, 5 indicates a journal box, 6 a journal extended into box 5 from the rear of the latter, 7 a packing or waste in the well of the box 5, 8 the bearing or brass for the journal 6 and 9 a wedge which not only seats on, but also has a part 10 disposed in superposed relation with respect to a part 11 of the bearing 8. The foregoing elements are of known construction and arrangement and are shown by way of example to illustrate the relation thereto of the retainer, in accordance with this invention and such retainer is generally indicated at 12.

The retainer 12 includes a foldable base member 13 of yoke-shaped form when extended. The bight of the member 13 is indicated at 14 and its arms, legs or sides at 15, 16. The arms 15, 16 are of like form and oppositely disposed. The retainer 12 also includes a pair of upstanding side cheeks 17, 18 of like form but oppositely disposed. The cheeks 17, 18 have their bottoms or lower portions detachably engaged with and removably seated on the arms 15, 16 respectively of the base member 12. The latter is formed from sheet metal.

The bight 13 of the base member 12 comprises a pair of oppositely disposed sections 19, 20 of like form and of substantially rectangular contour and each bight section has its front outer corner rounded, as at 21, and its outer side rounded, as at 22, which forms a continuation of the arc of a corner. The inner sides of the sections 19, 20 are horizontal and hinged together, as at 23, in a manner for the inner or lower faces of the two parts of the base member 12 to abut when the latter is folded. The bight sections 19, 20 at their front edges are formed with oppositely disposed vertical flanges of the desired height and of a length to extend from the hinged sides of the bight sections to rearwardly beyond the termini of said corners 21. Each flange 24 at its outer terminal portion 25 is in the form of a rearwardly directed portion free of and arranged over the upper face of a bight section inwardly of the outer side of the latter. The bight section 20 has secured to its upper face a keeper member 26 of a length to overlap a portion of the upper face of bight section 19. The latter has pivotally connected to its upper face a shiftable angle-shaped latching member 27 for correlation with the keeper member 26 for latching the bight sections 19, 20 in extended relation.

The arms 15, 16 are integral with the bight sections 19, 20 respectively and are of substantially inverted T-form. Each arm includes a bottom part 28 having a portion 29 of reduced width with respect to a portion 30 thereof, and with the latter of greater length than the former. The portion 29 is what may be termed the front portion of said bottom part 28 and it merges into the rear edge and is flush with the outer side edge of a bight section. The portion 30 at its front end has a part 31 which extends inwardly with respect to the rear end of portion 29. The edge 32 of said part 31 is rearwardly inclined. Each of the arms 15, 16 includes a top part 33 of L-shaped cross section formed of a horizontal leg 34 and a vertical leg 35. The leg 34 is disposed in superimposed relation for the major portion of its length with respect to the said bottom part 28 and has the remaining portion of its length seated on the rear portion of a bight section. The leg 34 is of a width less than half the width of and a length greater than the length of the portion 30 of bottom part 28. The outer side of that portion of the leg 34 arranged over the bottom part 28 merges into the outer side edge of the latter. The front part of that portion of the leg 34 arranged over a bight section is free of the outer side edge of the latter. That portion of the leg 34 arranged over a bight section is suitably secured to the latter. The vertical leg 35 has its bottom merge into the inner side of leg 34 and it extends from the rear portion of a bight section to the rear end of the leg 34. The leg 34 is suitably secured to and has its rear end flush with the rear end of the bottom part 28. The portion 30 of the bottom part 28 has the inner marginal portion thereof inturned against its lower face and swaged and slitted to form a row of depending saw-like teeth 36 for engaging in the waste or packing to prevent the shifting of the retainer 12 lengthwise of the packing or waste. The rear end of each side arm of the base member 13 is rounded. The rearwardly directed end terminals of the flanges 24 are suitably secured to the outer terminal portions of the outer sides of the legs 35.

Each side cheek is formed from a single piece of sheet metal of the desired width and length. Each side cheek includes a body part 37 formed of a high front portion 38 and a low rear portion 39 substantially corresponding in length and having their bottom edges aligned. Formed integral with the bottom edge of body part 37 and arranged against the lower marginal portion of the inner face of said body part 37 is a resilient coupler 40 for correlation with a leg 35 for detachably connecting a side cheek to an arm of the base member 13. The coupler 40 is of inverted channel form having its ends open and its mouth disposed at the bottom of the side cheek. The coupler 40 consists of a top wall 41, an outer side wall 42 opposing the inner face of the cheek and integral with the bottom of said bottom part 37 and an inner side wall 43 formed with a reinforcing fold 44. The side walls of the coupler are resilient for the purpose of binding against a leg 35 when a side cheek is arranged relatively to an arm of the base member 13. The front and rear portions 38, 39 of a side cheek are reinforced by the folds 45.

The front portion 38 of a side cheek is formed with a pair of spaced aligned openings 46 and a pair of inwardly extending collars 47 forming continuations of the walls of the openings 46. The front portion 38, of a side cheek, at its top and in proximity to its front edge is provided with a vertically disposed reinforcing stop 48 engageable with the front end of the wedge to limit the extent of the inward movement of the retainer in the journal box. The front portion 38 of each side cheek at its top and rearwardly of the stop 48 is provided with an inwardly extending downwardly inclined reinforcing holder or hook 49 of a length to extend from a point in close proximity to the stop 48 to a point in close proximity to the rear end of said portion 38. The holders 49 are adapted to seat on the portions 11 of the bearing for the purpose of holding said side cheeks in position relative to the bearing and journal. The collars are employed for reinforcing the side cheeks at the openings 46.

When the retainer is assembled and disposed in the packing box relative to the packing or waste, journal, brass or bearing and wedge, it will appear as shown in Figure 3 with the stops 48 abutting the wedge, the holders 49 interposed between the wedge and the bearing, the side cheeks 17, 18 disposed in parallel spaced relation with respect to the journal and the base member 13 seated on the packing with the teeth 36 engaging in the latter. The purpose of the side cheeks is to hold the base member 13 flat on the packing both endwise and sidewise and to keep the packing level at all times. The openings in the side cheeks permit of the removal thereof by a packing hook and in this connection the hook is engaged in the front opening 46 of a side cheek and the side cheek lifted up from an arm 15 or 16 and pulled to start the side cheek out, and then the hook is placed in the rear opening to finish the pulling out operation of the side cheek.

When the retainer is assembled in the position shown by Figures 1 and 3, it prevents the journal from rolling the packing from under the journal up the sides of the box and going under the bearing and causing hot boxes, as well as retaining the packing in a manner to prevent the draining of the oil or lubricant in a pool and under such conditions maintaining the packing saturated with lubricant, thereby insuring proper lubrication for the journal. Further the retainer acts to prevent the packing impairing the journal or bearing.

What I claim is:

1. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, and a resilient coupler on each side cheek for correlation with a vertical leg for detachably connecting a side cheek to the base member.

2. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, and a resilient coupler on each side cheek for correlation with a vertical leg for detachably connecting a side cheek to the base member, each side cheek including a high front portion and a rear low portion, said holders being at the upper ends of said high portions.

3. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, each side cheek including a high front portion and a rear low portion, said holders being at the upper ends of said high portions, and said high portions being formed with openings and with inwardly extending collars forming continuations of the walls of said openings.

4. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, and each of said cheeks being formed at its top with a vertically extending stop forwardly of the holder thereon.

5. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, each side cheek including a high front portion and a rear low portion, said holders being at the upper ends of said high portions, and said high portions at their upper ends being formed with vertically disposed stops forwardly of said holders.

6. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, each side cheek including a high front portion and a rear low portion, said holders being at the upper ends of said high portions, said high portions being formed with openings and with inwardly extending collars forming continuations of the walls of said openings, and said high portions at their upper ends being formed with vertically disposed stops forwardly of said holders.

7. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, and a resilient coupler on each side cheek for correlation with a vertical leg for detachably connecting a side cheek to the base member, said holders being disposed at a downward inclination.

8. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, each of said arms having depending from their lower faces a row of teeth, and each of said cheeks being formed at its top with a vertically extending stop forwardly of the holder thereon, said holders being disposed at a downward inclination.

9. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, and a resilient coupler on each side cheek for correlation with a vertical leg for detachably connecting a side cheek to the base member, said legs extending from over the rear portion of said bight to the rear ends of said arms.

10. A packing retainer comprising a yoke-shaped horizontally disposed base member formed of a bight and a pair of arms, each of said arms having a vertical leg disposed lengthwise thereof, a pair of upstanding side cheeks each having an inwardly extending holder at its top, a resilient coupler on each side cheek for correlation with a vertical leg for detachably connecting a side cheek to the base member, and each of said cheeks being formed at its top with a vertically extending stop forwardly of the holder thereon, said legs extending from over the rear portion of said bight to the rear ends of said arms.

11. A packing retainer comprising a foldable and extendible base member including a pair of spaced arms each having a row of teeth on one face and a leg on its other face, a pair of apertured side cheeks each formed with a stop and an inclined holder, a resilient coupler on each side cheek for correlation with a leg to slidably and detachably connect a side cheek to an arm of a base member, and means for latching the base member extended.

JOE E. POWERS.